(12) United States Patent
Johnston et al.

(10) Patent No.: US 7,332,095 B2
(45) Date of Patent: Feb. 19, 2008

(54) WET OXIDATION

(75) Inventors: James Howard Johnston, Wellington (NZ); Peter Thomas Northcote, Wellington (NZ); Michael James Richardson, Wellington (NZ)

(73) Assignee: Victoria Link Limited, Wellington (NZ)

( * ) Notice: Subject to any disclaimer, the term of this patent is extended or adjusted under 35 U.S.C. 154(b) by 309 days.

(21) Appl. No.: 10/518,589

(22) PCT Filed: Jun. 24, 2003

(86) PCT No.: PCT/NZ03/00128

§ 371 (c)(1),
(2), (4) Date: Dec. 21, 2004

(87) PCT Pub. No.: WO04/000423

PCT Pub. Date: Dec. 31, 2003

(65) Prior Publication Data

US 2005/0199557 A1    Sep. 15, 2005

(30) Foreign Application Priority Data

Jun. 24, 2002  (NZ) ................................. 519744

(51) Int. Cl.
C02F 1/78 (2006.01)
C02F 1/72 (2006.01)

(52) U.S. Cl. .............. 210/759; 210/760; 210/762; 210/908; 210/917; 210/928; 422/184.1

(58) Field of Classification Search ............... 210/762
See application file for complete search history.

(56) References Cited

U.S. PATENT DOCUMENTS

| | | | | |
|---|---|---|---|---|
| 3,449,247 A | * | 6/1969 | Bauer | 210/747 |
| 3,912,626 A | * | 10/1975 | Ely et al. | 210/710 |
| 4,000,068 A | * | 12/1976 | Nelson et al. | 210/721 |
| 4,384,959 A | | 5/1983 | Bauer et al. | 210/739 |
| 4,670,162 A | * | 6/1987 | Robey | 210/761 |
| 4,767,543 A | * | 8/1988 | Chornet et al. | 210/759 |
| 4,793,919 A | * | 12/1988 | McCorquodale | 210/177 |
| 5,240,619 A | | 8/1993 | Copa et al. | 210/752 |
| 5,370,801 A | * | 12/1994 | Sorensen et al. | 210/742 |

(Continued)

FOREIGN PATENT DOCUMENTS

AU        67711/90        6/1991

(Continued)

OTHER PUBLICATIONS

Kolaczkowski et al, Chem Engin Jour 73, 1999, pp. 143-160, Wet air oxidation: a review of process technologies and aspects . . . .

*Primary Examiner*—Peter A. Hruskoci
(74) *Attorney, Agent, or Firm*—Jacobson Holman PLLC

(57) ABSTRACT

An oxidation process is described which involves subjecting a feedstock which contains oxidizable material to temperature, pressure and contact with an oxidant. Excess water and volatile oxidation products, such as carbon dioxide, formic acid and acetic acid, are removed in the vapor phase. A catalyst may be employed to increase the rate of reaction. Preferred catalysts include the transition metal ions. Advantageously, the process may be operated in a continuous manner wherein the feedstock is continuously introduced into a reactor and a vapor phase containing volatile oxidation products continuously removed. The process is particularly applicable to the treatment of consumer and industrial waste.

29 Claims, 5 Drawing Sheets

U.S. PATENT DOCUMENTS

| | | | |
|---|---|---|---|
| 5,651,897 A | 7/1997 | Lehmann | 210/761 |
| 6,110,385 A * | 8/2000 | Copa et al. | 210/743 |
| 6,190,564 B1 | 2/2001 | Lehmann et al. | 210/741 |
| 6,632,365 B1 * | 10/2003 | Payraudeau et al. | 210/617 |
| 6,632,973 B1 * | 10/2003 | Miyake et al. | 588/316 |
| 6,866,788 B1 * | 3/2005 | Baig et al. | 210/758 |

FOREIGN PATENT DOCUMENTS

| | | |
|---|---|---|
| CA | 2249945 | 4/2000 |
| EP | 0431932 A1 | 6/1991 |
| EP | 0560505 A2 | 9/1993 |
| NZ | 229937 | 6/1991 |
| NZ | 501183 | 9/2001 |
| WO | WO88/06144 | 8/1988 |
| WO | WO96/13463 | 5/1996 |
| WO | WO97/05073 | 2/1997 |
| WO | WO97/36663 | 10/1997 |

* cited by examiner

WET OXIDATION

This is a nationalization of PCT/NZ03/000128 filed Jun. 24, 2003 and published in English.

TECHNICAL FIELD

The present invention relates to wet oxidation. A process is provided, in which organic or inorganic oxidisable material is subjected to an aqueous phase oxidation process to give oxidation products which are substantially in the vapour phase. Advantageously, the process is suitable for continuous operation. The process is particularly useful for the treatment of industrial waste.

BACKGROUND ART

Wet oxidation is an effective method for lowering the chemical oxygen demand (COD) of many compounds. When applied to waste treatment processes, wet oxidation involves the aqueous phase oxidation of predominantly organic compounds at elevated temperatures and pressures. Temperatures of 127-300° C. and pressures of 0.5-20 MPa are generally employed [1].

The vast majority of known processes relate to the wet oxidation of municipal sewage sludge [1].

The known processes all operate using the same general principles. A liquid or slurry is introduced into an autoclave via a pumping mechanism, and reacted with an oxidant under pressures and temperatures in the regions noted above. The products of the reaction are then removed from the reactor, largely in the liquid phase, cooled, and separated outside of the reactor.

Oxygen is only sparingly soluble in water and its use as an oxidant requires the process to be operated at a pressure significantly above that of the vapour pressure of the liquid at the operating temperature, in order to minimise the loss of liquid inside the reactor. However, the use of high temperatures and pressures which necessitate the use of, for example: expensive alloys in the fabrication of reactors; costly valves; and significant safety measures; together with the long reaction times required, have limited the application of wet oxidation.

One approach which has been applied to overcome these obstacles is the use of an appropriate catalyst. If a catalyst is employed to increase the rate of reaction, a lower temperature, and correspondingly lower pressure, is generally required. Typical catalysts comprise transition metal ions, the most effective of which are generally copper, manganese and iron. Due to their toxicity to other forms of life, these ions are restricted in terms of their disposal into public waterways. Therefore, strict disposal regulations apply to catalysts such as those based on transition metals.

Accordingly, the treated product from a wet oxidation reactor must have the concentration of the catalyst reduced to levels that satisfy the regulatory requirements. This may be achieved by, for example: precipitation as the hydroxide; pH modification to allow removal as the oxide; or a range of osmotic and electrochemical methods. All are costly and may be difficult to operate, thus limiting the use of catalysts in known processes.

Moreover, a mixture of compounds will usually be present in the waste stream to be treated and this further limits the known processes. The individual compounds generally have different rates of reaction, and therefore require different reactor residence times either in batchwise or continuous processes. This means that either:

(a) the reactor residence time is limited to that of the compound within the mixture with the slowest rate of reaction, which generally dictates the use of a proportionally larger reactor; or
(b) the process is less efficient and achieves a lower reduction in, for example, COD, biological oxygen demand (BOD) and percent conversion.

In addition, the more stable compounds—which are correspondingly more difficult to oxidise—may remain in the output stream from the reactor, and it is these compounds which are more likely to have detrimental environmental consequences.

These disadvantages have hindered the development of wet oxidation as a method for treating waste. Accordingly, it is an object of the present invention to provide a wet oxidation process which goes some way to overcoming these limitations, or at least provides the public with a useful choice.

SUMMARY OF INVENTION

In a first aspect, the present invention provides a process for wet oxidation of a feedstock comprising at least one non-volatile oxidisable material, which process includes at least the steps of:

(a) continuously introducing the feedstock into a reactor;
(b) contacting the feedstock at temperature and pressure with an oxidant in the presence of a catalyst to produce a vapour phase comprising at least some oxidation products and a liquid phase; and
(c) continuously removing at least some of the vapour phase comprising at least some oxidation products from the reactor while re d the liquid phase in the reactor.

The non-volatile oxidisable material may be a single substance or a mixture of substances, and may be a waste product such as industrial waste, consumer waste or a component thereof, all of which are well known in the art Generally the oxidisable material comprises an organic substance.

Preferably, the oxidisable material comprises one or more components selected from the group consisting of: lipids; proteins; carbohydrates (for example starch or cellulose); mineral oils; vegetable oils; waxes; and hydrocarbons.

Optionally, the oxidisable material includes one or more oxidisable inorganic compounds.

Oxidants which may be used in a process of the invention include, but are not limited to air, oxygen, ozone, peroxide, and mixtures thereof. Preferably, the oxidant is air, oxygen or peroxide.

The temperature at which the process is operated is generally between about 100° C. and about 350° C. and the pressure between 0.7 and 17.2 MPa.

Preferably, the temperature at which the process is old is between about 190° C. and about 300° C., more preferably between about 190° C. and about 280° C. In two particularly preferred embodiments, the temperature is between about 190° C. and about 210° C. or between about 220° C. and about 240° C.

Preferably, the pressure at which the process is operated is between about 1.4 MPa and about 13.0 MPa, more preferably between about 2.0 MPa and about 3.5 MPa. In two particularly preferred embodiments, the pressure is between about 2.1 MPa and about 2.9 MPa or between about 2.9 MPa and about 3.4 MPa.

The process of the invention is particularly applicable to the treatment of industrial and consumer waste.

The catalyst is employed to increase the rate of reaction. Suitable catalysts include, but are not limited to, the transition metal ions and mixtures thereof. Preferably, catalyst is copper (II) ions, iron (II) ions or manganese (II) ions, or a mixture thereof. More preferably, the catalyst is copper (II) ions.

Advantageously, oxidation is carried out as a continuous process wherein the feedstock is continuously introduced into the reactor and the vapour phase continuously removed from the reactor.

The oxidation products in the vapour phase removed from the reactor may be recovered by reducing the temperature and pressure of the vapour phase. Accordingly, in another aspect, the present invention provides an oxidation product when produced by a process of the invention.

In a preferred embodiment, the oxidation product is acetic acid, formic acid, carbon dioxide or a mixture thereof.

In another aspect, the present invention provides a non-volatile salt when produced by an oxidation process of the invention.

Although the present invention is broadly as defined above, those persons skilled in the art will appreciate that the invention is not limited thereto and that the invention also includes embodiments of which the following description gives examples.

DETAILED DESCRIPTION OF THE INVENTION

Figure 1:
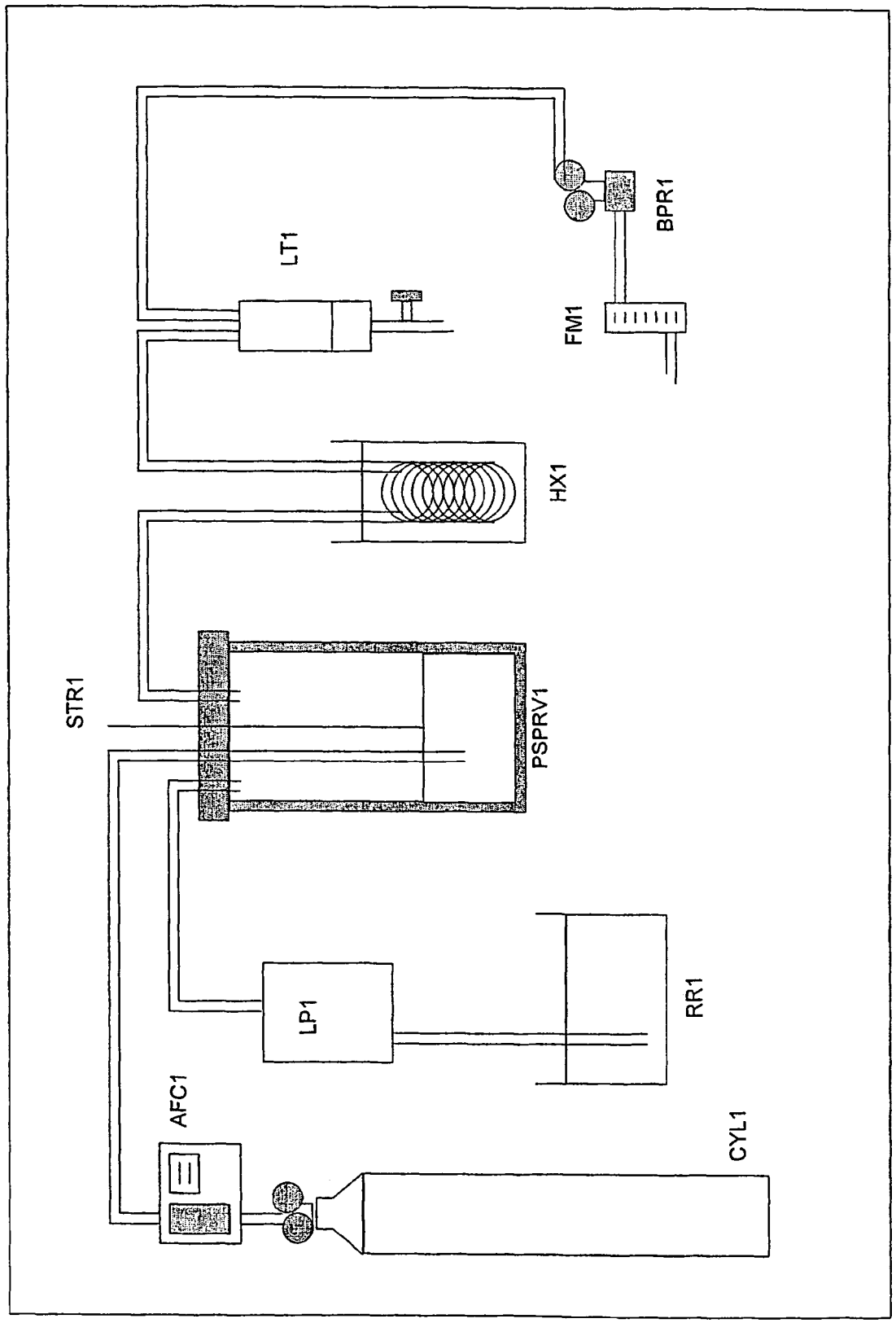
FIG. 1 is a schematic diagram of apparatus particularly suitable for performing an oxidation process of the invention on a laboratory scale.

The present invention is broadly to the oxidation of various substances, conveniently described herein as "Phase Transfer Wet Oxidation".

Accordingly, in a first aspect, the present invention provides a process for wet oxidation of a feedstock comprising at least one nonvolatile oxidisable material, which process includes at least the steps of:
(a) continuously introducing the feedstock into a reactor;
(b) contacting the feedstock at temperature and pressure with an oxidant in the presence of a catalyst to produce a vapour phase comprising at least some oxidation products and a liquid phase; and
(c) continuously removing at least some of the vapour phase comprising at least some oxidation products from the reactor while retaining the liquid phase in the reactor.

The term "feedstock" as used herein includes, but is not limited to, aqueous liquids, solutions, suspensions, colloids, emulsions, and other mixtures. The term may also include slurries formed from substantially dry material to which is added a suitable aqueous liquid.

The amount of oxidisable material in the feedstock is typically less than about 10% by weight.

In one embodiment, the feedstock is fed directly into the reactor. In an alternative embodiment, water is firstly introduced into the reactor and then the oxidisable material is introduced into the reactor.

The term "contact" as used herein generally means admixing the aqueous solution or slurry with the oxidant in a suitable reactor, which is of a type designed to withstand the temperature and pressure and is well known in the art. Suitable reactors include, but are not limited to autoclaves and pressure reactors.

The term "non-volatile" as used herein means that the oxidisable material is largely in the solid or liquid state under the temperature and pressure conditions in the reactor.

It will be appreciated that, preferably, the reactor is one, in which the interfacial area between the oxidant and the feedstock is maximised, and from which the reaction products and the volatile non-oxidisable components present in the feedstock (for example, water) may be readily removed in the vapour phase.

The vapour phase is removed from the reactor while the liquid phase is retained in the reactor.

In one embodiment, phase separation may be achieved by keeping the reaction pressure near to the vapour pressure of water at the reaction temperature by, for example, rapidly lowering the pressure of the reactor to remove volumes of treated material by flash vaporisation at specific intervals.

The feedstock may be introduced into the reactor by means of a pump or hydraulic plunger or by other means as are known in the art Optionally, the reactor may incorporate a means of siring the contents, if and when required.

It will be appreciated that the temperature and pressure at which the process of the invention is operated are selected according to the stability or ease of oxidation of the feedstock. The temperature at which the process is operated is generally between about 100° C. and 350° C. and the pressure been about 0.7 MPa and about 17.2 MPa.

Preferably, the temple at which the process is operated is between about 190° C. and about 300° C., more preferably between about 190° C. and about 280° C. In two particularly preferred embodiments, the temperature is between about 190° C. and about 210° C. or between about 220° C. and about 240° C.

Preferably, the pressure at which the process is operated is between about 1.4 MPa and about 13.0 MPa, more preferably between about 2.0 MPa and about 3.5 MPa. In two particularly preferred embodiments, the pressure is between about 2.1 MPa and about 2.9 MPa or between about 2.9 MPa and about 3.4 MPa.

The present invention also contemplates processes in which the feedstock is at the desired temperature and/or pressure prior to entering the reactor, for example a process in which the feedstock comprises a mixture of non-volatile oxidisable material and superheated steam.

Oxidants which may be used in a process of the invention include, but are not limited to: air, oxygen, ozone, peroxide, and mixtures thereof. Preferably, the oxidant is air, oxygen or peroxide. The oxidant is introduced into the reactor at an equivalent or greater pressure to that of the reactor and at a rate sufficient to effect oxidation.

Substances amenable to oxidation by a process of the invention are those which are relatively non-volatile under the temperature and pressure conditions at which the process is operated, and for which the major oxidation products are volatile under the same or similar conditions.

The feedstock may comprise more that one non-volatile oxidisable material. The non-volatile oxidisable material may be a single substance or a mixture of substances, and may be a waste product such as industrial waste, consumer waste or a component thereof, all of which are well known in the art.

Generally the oxidisable material comprises an organic substance.

Preferably, the oxidisable material comprises one or more components selected from the group consisting of: lipids; proteins; carbohydrates (for example starch or cellulose); mineral oils; vegetable oils; waxes; and hydrocarbons.

It will be appreciated that some inorganic substances may be oxidised in a process of the invention. For example, phosphorus may be oxidised to phosphate in a process of the invention. Similarly, sulfur may be oxidised to sulfate and nitrogen to nitrate. Therefore, the oxidisable material may optionally include one or more oxidisable inorganic compounds.

As explained in detail below, the process of the invention is particularly applicable to the treatment of industrial and consumer waste. That is the invention provides a process for treating waste, the process comprising combining the waste with water, if required, then subjecting the waste to steps (a) to (c) as detailed above.

The term "treat" as used herein means that the chemical oxygen demand (COD) or biological oxygen demand (BOD) of the waste is reduced.

Suitable waste for treatment in a process of the invention includes consumer and industrial waste including, but not limited to:

dairy shed waste, for example "cow dung" from milking shed wash downs;
pig and chicken waste;
milk processing plant waste including milk, cheese and butter vat wash downs;
food processing wastes, for example from the washing and preparation of vegetables;
waste from the wine industry and brewing industry;
food waste;
shipboard waste;
waste in environmentally sensitive locations;
waste from the wash downs and oil-traps of petroleum service stations and garages;
waste fats and proteins from the meat processing industry, for example abattoir stickwater;
wool-scouring waste;
sewage;
medical waste;
fibre, ink and polymeric material from the deinking waste produced in the recycling of paper;
waste paper and paper products;
waste from the wood processing industry including waste wood and wood products, wood
fibre, saw dust and wood treated with preservatives;
rubber waste;
plastic waste; and
tannin and colorants from wood pulping streams.

Similarly, other waste treatment applications to which a process of the invention may be applied include, but are not limited to:

reclamation of sites contaminated by organic materials including at least petrochemical, gas works, timber treatment or agrochemical sites; and
recovery of inorganic preservatives from wood.

While the oxidisable substances are relatively non-volatile, their primary wet oxidation products are generally much more volatile compounds such as carbon dioxide, acetic acid, and formic acid. It will therefore be understood that while the feedstock is introduced to the reactor in the liquid or solid phase, the products of the oxidation reaction may be removed from the reactor in the vapour phase, hence the name "Phase Transfer Wet Oxidation".

Accordingly, a significant portion of the oxidation products from a process of the invention is removed in the gas phase. This is in contrast to the known processes in which the reaction products are generally removed in the liquid phase.

It will be appreciated that any compound which is volatile at the reaction temperature may be present in the gas phase. However, any higher molecular weight compounds, such as higher organic acids, will generally be present at very low concentrations.

The oxidation products in the vapour phase removed from the reactor may be recovered by reducing the temperature and pressure of the vapour phase. Accordingly, in another aspect, the present invention provides an oxidation product when produced by an oxidation process of the invention.

Typical oxidation products include, but are not limited to, carbon dioxide, formic acid, acetic acid, higher organic acids and mixtures thereof.

In a preferred embodiment, the oxidation product is acetic acid, formic acid, carbon dioxide or a mixture hereof.

More preferably, the oxidation product is acetic acid or a mixture of acetic acid and formic acid. The acetic acid so provided is sterile. Accordingly, the acetic acid may be converted to acetate and utilised as a nutrient source for micro-organisms.

Advantageously, the temperature and pressure of the vapour phase removed from the reactor is reduced in a heat exchanger and the heat recycled to the incoming feedstock. In another embodiment, the incoming feedstock and the reactor contents are optionally heated by the addition of external beat.

Advantageously, the oxidation process of the invention is carried out as a continuous process wherein the feedstock is continuously induced into the reactor and the vapour phase continuously removed.

Because the oxidation is carried out as a continuous process, it will be appreciated that the reactor may advantageously incorporate a means of measuring the liquid level within the reactor, such that the reactor does not run dry.

If a mixture of oxidisable substances is subjected to a process of the invention, then those with a faster rate of reaction will oxidise first, and the products of the reaction are removed in the vapour phase as they are formed. More stable substances, with a correspondingly slower rate of reaction, will remain in the reactor until they have oxidised to volatile products. Any in the feedstock egg the reactor will also be vaporised, thereby permitting more feedstock to enter the reactor. This is in contrast to the known processes, which require either a large reactor, or provide a reduction in the percent conversion of oxidisable substances to their oxidation products.

The catalyst is employed to increase the rate of reaction. Suitable catalysts include, but are not limited to, the transition metal ions and mixtures thereof. Preferably, the catalyst is copper (II) ions, iron (II) ions or manganese (II) ions, or a mixture thereof. More preferably, the catalyst is copper (II) ions.

While it will be appreciated that the process of the invention is amenable to heterogeneous catalysis, the catalyst may advantageously be in the form of a homogenous catalyst. In the known processes, the use of homogenous catalysts generally leads to catalyst leaching and subsequent contamination of the downstream products. However, it will be appreciated that, in a process of the present invention, the catalyst may remain in the dissolved liquid phase in the reactor. In this way an initial amount of catalyst may be introduced into the reactor, where it will remain while multiple volumes of feedstock are introduced into the reactor and the oxidation products removed in the vapour phase.

Thus, the catalyst does not need to be replaced until the entire reactor is emptied, for example for cleaning, or unless a feedstock with a high salt content is being treated. For feedstocks with a high salt content, the non-volatile salts accumulate inside the reactor, which may require a "flush" cycle as the solubility limit of the least-soluble salt is approached and the effective reactor volume decreases.

Desirably, any useful non-volatile salts which accumulate in the reactor may be recovered. In one embodiment, applying a process of the invention to the treatment of tanalised wood waste will lead to an accumulation of copper chrome arsenate in the reactor which may be recovered and recycled. In an alternative embodiment, phosphate, sulfate and nitrate salts resulting from the oxidation of proteins in a process of the invention will accumulate in the reactor and may precipitate when their saturation solubility is exceeded. Advantageously, the concentrated solution or precipitated salts may be used for other applications, for example as a fertiliser.

Accordingly, in another aspect, the present invention provides a non-volatile salt when produced by an oxidation process of the invention.

Those persons skilled in the art will appreciate that there is a relationship between the internal volume of the reactor and the volume of feedstock that may be treated by means of Phase Transfer Wet Oxidation before the system is flushed and the process restarted. This ratio may be conveniently referred to as the "Batch Ratio".

It will be appreciated that unless external heat is applied, the heat-balance of the overall reaction must be great enough to compensate for the enthalpy of vaporisation at the reactor operating temperature, along with the energy required to bring the feedstock to that temperature. Heat will be provided by the exothermic nature of the reaction and may also be recovered, via a cool-down heat exchanger, from the vapour phase as it is removed from the reactor. This is summarised in Equation 1.

$$Q = \Delta H_{rxt} + E_{recyc} - E_{temp} - m_f \Delta H_v = \Delta H_{rxt} + E_{recyc} - m_v c \Delta T - m_f \Delta H_v \geq 0 \quad \text{Equation 1}$$

where $\Delta H_{rxt}$ is the enthalpy of reaction, $E_{recyc}$ the energy recovered from the cool-down heat exchanger, $E_{temp}$ the energy required to raise the feedstock to the desired operating temperature, $\Delta H_v$ the heat of vaporisation of the liquid at the operating temperature, $m_f$ the mass of feedstock, $m_v$ the mass of the vapour, c the specific heat of the feedstock, and $\Delta T$ the difference between the feedstock and operating temperatures.

The pollution potential for a waste stream is often measured in terms of its COD which equates to the mass of oxygen required to convert the sample from its original "high energy state" to carbon dioxide and water. A similar measurement provides the BOD which equates to the mass of oxygen consumed by a standard biological organism—generally a species of bacteria—as it uses the waste stream as a nutrient source. Thus, an effective measure of the extent to which a sample has been degraded, and one which is often used as a legal means of classification into "acceptable" and "unacceptable" waste streams, is the difference between the COD and/or BOD of the sample before and after processing.

For thermal combustion at atmospheric pressure, where the oxidant is in the gas phase, the reactants are converted to, inter alia, carbon dioxide, water, sulfur dioxide, nitrogen dioxide, phosphorus pentoxide and sulfur dioxide (Equation 2).

$$C_xH_yO_zNPS_{(s)} + O_{2(g)} \rightarrow CO_{2(g)} + H_2O_{(g)} + SO_{2(g)} + NO_{2(g)} + P_2O_{5(s)} + \text{residue} \quad \text{Equation 2}$$

While often utilised in the past as a disposal method, thermal combustion has lost favour due to venting of the gases produced to the atmosphere. In addition, the reactants must be sufficiently dry to allow the combustion to be self-sustaining.

In contrast to thermal combustion, wet oxidation utilises dissolved oxygen at elevated pressures and temperatures to carry out the oxidation. However, the products of the oxidation of nitrogen, phosphorus and sulfur, for example, are kept in the liquid phase with sulfur as sulfate, nitrogen as nitrate and phosphorus as phosphate (Equation 3). A portion of the carbon is oxidised to carbon dioxide and dissolves in the liquid phase to form carbonate/bicarbonate ions.

$$C_xH_yO_zNPS_{(s)} + O_2 \rightarrow CO_{2(g)} + HCO_3^-{}_{(aq)} + H_2O_{(l)} + SO_4^{2-}{}_{(aq)} + NO_3^-{}_{(aq)} + PO_4^{3-}{}_{(aq)} + \text{residue} \quad \text{Equation 4}$$

Thus, the theoretical products of wet oxidation are carbonate/bicarbonate and water, plus any inorganic ions, generally oxy-anions, resulting from the presence of other elements in the oxidisable material. However, in practice the reaction does not convert the entire initial carbon loading to carbonate/bicarbonate. Instead, quantities of acetic and formic acids are formed (Equation 4) and much lower levels of higher molecular weight organic acids.

$$C_xH_yO_zNPS_{(s)} + O_2 \rightarrow CH_3CO_2H_{(l)} + HCO_2H_{(l)} + CO_{2(g)} + HCO_3^-{}_{(aq)} + H_2O_{(l)} + SO_4^{2-}{}_{(aq)} + NO_3^-{}_{(aq)} + PO_4^{3-}{}_{(aq)} + \text{residue} \quad \text{Equation 4}$$

These acids are generally the major products of reaction, and thus the primary source of COD and BOD in the products.

An analysis of the phase diagram of acetic acid in water at the temperatures and pressures associated with wet oxidation, shows that the concentrations of this compound in the vapour phase and the liquid phase are almost identical. These data are presented in Table 1, Table 2 and Table 3. Formic acid behaves in a similar manner. Therefore, as the oxidisable substances are non-volatile under the conditions generally used for wet oxidation and the products of the reaction-principally acetic acid, formic acid, water and carbon dioxide—are volatile under these conditions, the two may be separated.

TABLE 1

Acetic acid concentrations
(10% w/w in water initially) in the vapour phase[1]

| Temp. (° C.) | Pressure (kPa) | Acetic acid (% w/w) |
|---|---|---|
| 160 | 551 | 5.0 |
| 180 | 965 | 7.4 |
| 200 | 1516 | 8.0 |
| 220 | 1964 | 8.2 |
| 240 | 3032 | 8.1 |
| 260 | 4272 | 8.1 |
| 280 | 5684 | 8.2 |
| 300 | 7441 | 8.8 |

TABLE 2

Acetic acid concentrations
(20% w/w in water initially) in the vapour phase[1]

| Temp. (° C.) | Pressure (kPa) | Acetic acid (% w/w) |
|---|---|---|
| 160 | 655 | 14.1 |
| 180 | 1034 | 17.5 |
| 200 | 1516 | 17.3 |
| 220 | 1998 | 18.9 |
| 240 | 3032 | 17.5 |
| 260 | 4237 | 18.0 |
| 280 | 5753 | 18.5 |
| 300 | 7441 | 18.0 |

TABLE 3

Acetic acid concentrations
(40% w/w in water initially) in the vapour phase[1]

| Temp. (° C.) | Pressure (kPa) | Acetic acid (% w/w)[2] |
|---|---|---|
| 160 | 620 | 29.8 |
| 180 | 896 | 32.6 |
| 200 | 1550 | 33.0 |
| 220 | 2101 | 36.1 |
| 240 | 3032 | 37.3 |
| 260 | 3858 | 37.6 |
| 280 | 5581 | 39.0 |
| 300[3] | 6787 | 43.2 |

[1] 1 L samples in the 2 L autoclave. For the 20 & 40% w/w runs, the samples were purged with argon for 10 minutes prior to heating.
[2] Estimated by integration of the $^1$H NMR exchangeable and non-exchangeable peaks.
[3] Liquid removed after run was a dark-brown colour, indicating possible decomposition and carbonisation of the initial acid.

This contrasts with the known processes, wherein both the untreated waste stream (the feedstock) and the treated stream (the products) are generally in the liquid phase.

EXPERIMENTAL

EXAMPLE 1

Glucose

Glucose is similar to the constituents of many industrial waste streams, in particular cellulose and starch. In addition, glucose is readily oxidisable, and the products of reaction easily analysed. Therefore it is an ideal model compound.

Method

The apparatus shown in, and described with reference to, FIG. 1 was used for this Example. A 1% (w/v) solution of glucose was pumped from the reactant reservoir RR1 by an HPLC pump LP1 at a rate of 8 mL.min$^{-1}$ into an autoclave PSPRV1 (a Parr Stirred Pressure Reactor Vessel of 2 L capacity, of which less than 400 mL was used at any one time), the autoclave having been pre-filled with 300 mL of the aforesaid glucose solution. Air was introduced from a standard gas cylinder CYL1 through an air flow controller AFC1 at a rate of approximately 15 standard cubic feet per hour (SCFH), measured on the outlet line from the reactor. This is significantly more than that required to effect the oxidation of the glucose solution, but was deemed necessary due to the poor mixing observed in the small reactor. The reactor was stirred by means of a motor-driven rod STR1 with stirring blades submerged below the liquid level, and rotated at a rate of 600 rpm.

The reactor was heated electrically to a temperature of 200° C., and the temperature kept at this level by means of a thermostat-led control system.

The outlet port was connected to a cooling bath HX1 and liquid trap LT1, whereby the reaction products could be removed as required. The pressure and flow of gas through the outlet port was controlled via a back-pressure regulator BPR1 coupled to a pressure gauge. Carbon dioxide, nitrogen, and unreacted oxidant passed through this regulator, the pressure dropped to ambient, and the gas flow on the outlet side was measured by gas flow meter FM1 before the gases were vented to the atmosphere.

A summary of the reaction conditions used in this Example are listed in Table 4.

TABLE 4

Summary of Conditions Used in the Treatment of Glucose

| Component | Value | Units |
|---|---|---|
| Pressure at tank (regulator) | 2.76 | MPa |
| Pressure in reactor | 2.62 | MPa |
| Back pressure regulator | 2.21 | MPa |
| Reaction temperature | 200 | ° C. |
| Pumping rate (feedstock) | 8.00 | mL · min$^{-1}$ |
| Stirring speed | 600 | rpm |
| Oxidant flow | 15 | SCFH (air) |
| Reactor volume (total) | 2000 | mL |
| Reactor volume (utilised) | 300 | mL |

Results

The chemical oxygen demand (COD), pH, and low molecular weight organic acids produced were analysed. These are listed in Table 5, Table 6 and Table 7. The results show that the process was able to be operated with the feedstock (glucose solution) being continuously added to the reactor, and the products of reaction (primarily acetic acid, formic acid and carbon dioxide) being continuously withdrawn from the reactor in the vapour phase, before being condensed to ambient temperature.

Figure 4:
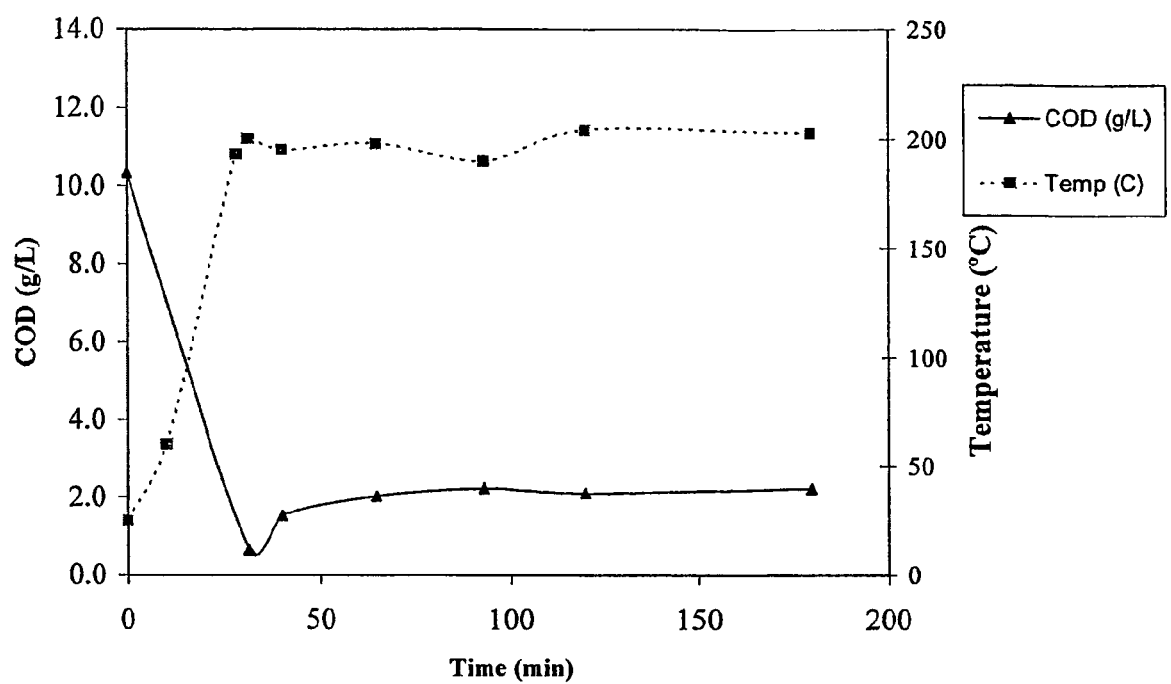
FIG. 4 is a graph of COD and temperature vs time for the oxidation of glucose at 200° C. in a process of the invention.

The COD of both the feedstock (glucose) and the products (primarily water, acetic and formic acids) were measured throughout the experiment and the results are presented in Table 6. The feedstock COD ($COD_i$) was constant at 10.3 g.L$^{-1}$, while the COD of the treated stream ($COD_f$) varied between 0.65 and 2.23 g.L$^{-1}$. The change in temperature and in the COD of the treated stream with respect to time is represented graphically in FIG. 4.

Figure 5:
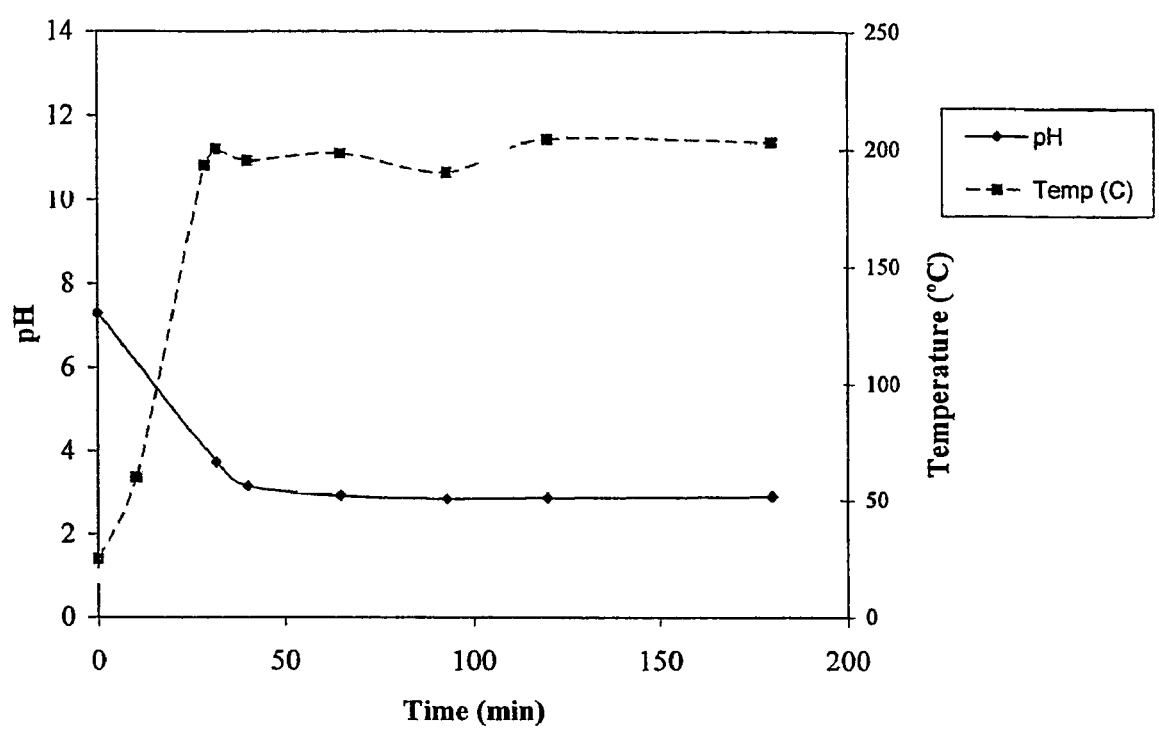
FIG. 5 is a graph of pH and temperature vs time for oxidation of glucose at 200° C. in a process of the invention.

A total of 6.40 g COD (as glucose) was added to the reactor. The product stream had a total COD of 1.56 g which is a reduction of 75.6% from that of the untreated glucose (see Table 7). The pH of the treated stream withdrawn in the vapour phase was measured and these data are presented in Table 5. The pH of the treated stream decreased to approximately 3, consistent with the formation of the low molecular weight organic acids. The change in temperature and in the pH of the treated stream withdrawn in the vapour phase with respect to time is represented graphically in FIG. 5.

TABLE 5

Low Molecular Weight Organic Acids Produced in the Oxidation of Glucose at 200° C.

| Min | Acetic (mg · L$^{-1}$) | Formic (mg · L$^{-1}$) | pH |
|---|---|---|---|
| 0 | 0 | 0 | 7.30 |
| 31 | 42 | 196 | 3.72 |

TABLE 5-continued

Low Molecular Weight Organic Acids Produced in the Oxidation of Glucose at 200° C.

| Min | Acetic (mg · L$^{-1}$) | Formic (mg · L$^{-1}$) | pH |
|---|---|---|---|
| 40 | 316 | 107 | 3.14 |
| 65 | 586 | 224 | 2.91 |
| 93 | 486 | 2129 | 2.85 |
| 120 | 340 | 1030 | 2.86 |
| 180 | 308 | 1162 | 2.90 |
| Post run | 511 | 5755 | 2.64 |

TABLE 6

Reduction of COD in the Oxidation of Glucose

| Min | ° C. | V$_{out}$ (mL/min) | COD$_i$ (g/L) | COD$_f$ (g/L) | Red (%) in COD |
|---|---|---|---|---|---|
| 0 | 25 | 0.0 | 10.34 | — | — |
| 10 | 60 | 0.0 | — | — | — |
| 28 | 193 | 0.0 | — | — | — |
| 31 | 200 | 16.5 | 10.34 | 0.65 | 93.8 |
| 40 | 195 | 8.5 | 10.34 | 1.53 | 85.2 |
| 65 | 198 | 7.0 | 10.34 | 2.03 | 80.4 |
| 93 | 190 | 4.0 | 10.34 | 2.23 | 78.4 |
| 120 | 204 | 4.4 | 10.34 | 2.11 | 79.6 |
| 180 | 203 | 1.5 | 10.34 | 2.23 | 78.4 |
| Post run | — | 102.9 | 10.34 | 3.51 | 66.1 |

Table 6 also shows the volume of product removed at each stage in the reaction which was typically 7 mL.min$^{-1}$, though a large variation was noted due to the equipment used. It is unlikely that such a variation would exist in a scaled-up process.

TABLE 7

Summary of the Oxidation of Glucose

| Component | Result |
|---|---|
| Total COD in | 6.40 g |
| Total COD out | 1.56 g |
| Reduction in COD | 4.84 g |
| Percentage reduction in COD | 75.6% w/w |

EXAMPLE 2

Lard (100 mg.kg$^{-1}$ Cu$^{2+}$)

Commercial lard is similar to the constituents of many waste streams from the dairy and meat processing industries. It is not readily oxidisable under ambient conditions, and generally requires a catalyst to achieve a significant reduction in chemical oxygen demand at temperatures below 270° C. Standard batch runs were carried out with an equivalent sample (stickwater from a local abattoir) both with and without a catalyst to illustrate this. It was found that without a catalyst, a temperature of 280° C. was required to achieve a reduction in COD of 78%. At 230° C., a catalyst concentration of 100 mg.kg$^{-1}$ Cu$^{2+}$ gave a reduction in COD of 69%, while at a concentration of 1000 mg.kg$^{-1}$ Cu$^{2+}$ (see Example 3) a reduction in COD of 83% was achieved. However, when no catalyst was used at the same temperature (230° C.), the reduction in COD was limited to approximately 55%.

Method

Figure 2:
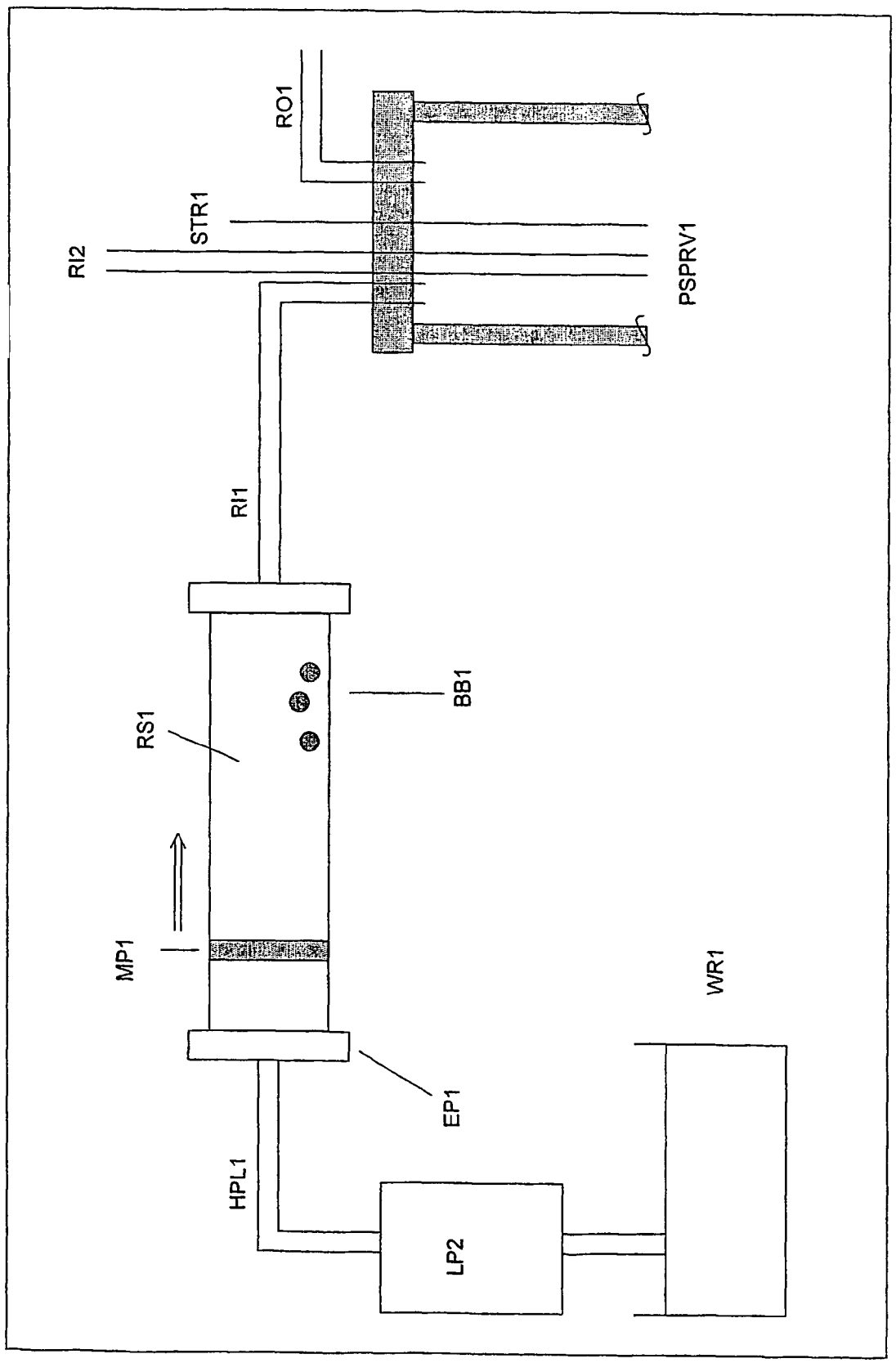
FIG. 2 is a schematic diagram of the additional modifications which may be made to the apparatus of FIG. 1 to facilitate the treatment of slurries.

The experimental apparatus shown in FIG. 1 and described above, with the modification shown in, and described with reference to, FIG. 2 was used for this Example.

An emulsion of lard in water (approximately 1% w/v) RS1 was loaded into a hydraulic plunger together with some large ball bearings BB1 to provide mixing when the hydraulic plunger was agitated by shaking. An HPLC pump LP2 was used to pump water from reservoir WR1 into the hydraulic plunger via line HPL1 through the bolt-on endplate EP1. The water slowly filled the hydraulic plunger, moving the piston MP1 and pumping the emulsion at a rate of 8 mL/min through inlet RI1 into an autoclave PSPRV1 (2 L capacity, of which less than 400 mL was used at any one time), the autoclave having been pre-filled with 300 mL of water containing 100 mg.kg$^{-1}$ Cu$^{2+}$(as CuSO$_4$.5H$_2$O).

Pumping of the emulsion was not started until the reactor had reached operating temperature (230° C.) after which it was kept at this level by means of a thermostat controlled system. Air was introduced into the autoclave through inlet RI2 from a standard gas cylinder at a rate of approximately 11±2 standard cubic feet per hour (SCFH), measured on the outlet line from the reactor. This is significantly more than that required to effect the oxidation of the lard solution, but was deemed necessary due to the poor mixing observed in the small reactor. The reactor was stirred by means of a motor-driven rod STR1 with stirring blades submerged below the liquid level, and rotated at a rate of 600 rpm.

The outlet port RO1 was connected to a cooling bath and liquid trap, whereby the reaction products could be removed as required. The pressure and flow of gas through the outlet port was controlled via a back-pressure regulator coupled to a pressure gauge. Carbon dioxide, nitrogen, and unreacted oxidant passed through this regulator, the pressure dropped to ambient, and the gas flow on the outlet side measured before venting the gases to atmosphere.

A summary of the reaction conditions used in this Example are listed in Table 8.

TABLE 8

Summary of Conditions Used in the Oxidation of Commercial Lard with 100 mg · kg$^{-1}$ Cu$^{2+}$

| Component | Value | Units |
|---|---|---|
| Pressure at tank (regulator) | 3.31 | MPa |
| Pressure in reactor | 3.17 | MPa |
| Back pressure regulator | 3.03 | MPa |
| Reaction temperature | 230 | ° C. |
| Pumping rate (feedstock)[1] | 8.00 | mL · min$^{-1}$ |
| Stirring speed | 600 | rpm |
| Oxidant flow | 11 ± 2 | SCFH (air) |
| Reactor volume (total) | 2000 | mL |
| Reactor volume (utilised) | 300 | mL |

[1]Pumping not started until time = 51 min (when operating temperature was reached).

Results

The results of the phase-transfer wet oxidation of commercial lard with 100 mg.kg$^{-1}$ Cu$^{2+}$ are shown in Table 9, Table 10, Table 11 and Table 12.

The results show that a sample of lard (as an emulsion in water) could be continuously pumped into the reactor, while at the same time the products of reaction could be continuously removed in the vapour phase and cooled in a heat-exchanger before exiting the system. Further to this, an initial dose of catalyst at a concentration of 100 mg.kg$^{-1}$ could treat the entire sample, and provide a reduction in COD greater than that able to be achieved in the absence of a catalyst. It should also be noted that while 100 mg.kg$^{-1}$ of catalyst was used, if this is recalculated over the entire treated volume, it then equates to 22.5 mg.kg$^{-1}$.

The COD of both the untreated and treated streams were measured throughout the course of the reaction and the results are presented in Table 10. The (untreated) emulsion of lard in water had a constant COD of 5476 mg.kg$^{-1}$, while the treated products had a COD in the order of approximately 1000 mg.kg$^{-1}$. In total, the feedstock had a total COD of 5.65 g, while the treated stream had a total COD of 1.99 g which is a reduction of 64.7% (see Table 12).

TABLE 9

Oxidation of Lard (100 mg · kg$^{-1}$ Cu$^{2+}$)-pH, Temperature and Condensate Volumes

| Time (min) | Temp (° C.) | V$_{out}$ (mL) | pH |
|---|---|---|---|
| 0[1] | 18 | | 8.70 |
| 60 | 225 | 170.0 | 6.67 |
| 70 | 227 | 100.1 | 4.60 |
| 80 | 235 | 50.5 | 3.70 |
| 90 | 223 | 39.4 | 3.58 |
| 100 | 227 | 39.6 | 3.50 |
| 120 | 227 | 92.4 | 3.62 |
| 150 | 225 | 116.3 | 3.18 |
| 180 | 227 | 176.4 | 2.84 |
| Vol left in reactor: | | 154.0 | 2.46 |

[1]Sample taken from inlet line to reactor

TABLE 10

Oxidation of Lard (100 mg · kg$^{-1}$ Cu$^{2+}$)-COD data

| Time (min) | COD (mg · L$^{-1}$) |
|---|---|
| Untreated | 5476 |
| 60 | 2600 |
| 120 | 634 |
| 180 | 970 |
| Post run | 4214 |

TABLE 11

Oxidation of Lard (100 mg · kg$^{-1}$ Cu$^{2+}$)-Formic and Acetic acid Concentrations

| Time (min) | Acetic (mg · L$^{-1}$) | Formic (mg · L$^{-1}$) |
|---|---|---|
| Pre-run | 32 | 50 |
| 60 | 80 | 63 |
| 70 | 62 | 70 |
| 80 | 68 | 80 |
| 90 | 85 | 91 |
| 100 | 100 | 90 |
| 120 | 99 | 82 |
| 150 | 101 | 89 |
| 180 | 120 | 116 |
| Post-run | 216 | 211 |

As shown in Table 9, the pH of the treated stream dropped from 6.67 to 2.84 during the course of reaction which is consistent with the formation of formic and acetic acids. The concentration of these acids was also measured during the course of the reaction and the results are presented in Table 11. The concentration was found to be in the order of 70 mg.kg$^{-1}$ for both acetic and formic acid.

TABLE 12

Summary of Results in the Oxidation of Lard (100 mg · kg$^{-1}$ Cu$^{2+}$)

| Component | Result |
|---|---|
| Total COD in | 5.65 g |
| Total COD out | 1.99 g |
| Reduction in COD | 3.66 g |
| Percentage reduction in COD | 64.7% w/w |
| Total volume treated | 1332 mL |
| Lost as vapour | 393 mL |
| Batch ratio | >4.4 |
| | (based on 300 mL) |

EXAMPLE 3

Lard (1000 mg.kg$^{-1}$ Cu$^{2+}$)

Method

The method used was identical to that for Example 2 (Lard (100 mg.kg$^{-1}$ Cu$^{2+}$)) except that 1000 mg.kg$^{-1}$ Cu$^{2+}$ was used as the catalyst. As with Example 2, the experimental apparatus used was that shown in FIG. 1 and FIG. 2.

TABLE 13

Summary of Conditions Used in the Oxidation of Commercial Lard with 1000 mg · kg$^{-1}$ Cu$^{2+}$

| Component | Value | Units |
|---|---|---|
| Pressure at tank (regulator) | 3.24 | MPa |
| Pressure in reactor | 3.17 | MPa |
| Back pressure regulator | 3.03 | MPa |
| Reaction temperature | 230 | ° C. |
| Pumping rate (feedstock)[1] | 8.00 | mL · min$^{-1}$ |
| Stirring speed | 600 | rpm |
| Oxidant flow | 8 | SCFH (air) |
| Reactor volume (total) | 2000 | mL |
| Reactor volume (utilised) | 300 | mL |

[1]Pumping not started until operating temperature was reached (denoted t = 0).

A summary of the reaction conditions used in this Example are listed in Table 13.

Results

The results are presented in Table 14, Table 15 and Table 16. These show that when the initial dose of catalyst is increased to 1000 mg.kg$^{-1}$ a reduction in COD of 83% may be achieved, with the same concentration of catalyst treating approximately 5.8 volumes of waste. It should be noted that the volume treated was limited only by the equipment available, in particular the size of the hydraulic plunger used to transfer the feedstock into the autoclave. In practice the volume able to be treated by a single dose of catalyst would be many times greater than that achieved here.

Samples were withdrawn at periodic intervals from the treated stream and their COD and volume measured. The sample volumes are shown in Table 14 and the COD in Table 15. The volume of the treated stream was slightly less than that pumped in, due to the partial loss of carbon dioxide as vapour from the reaction: Additionally, the oxidant used was dry air from a compressed cylinder, which upon leaving the reaction would have taken up a small volume of water.

TABLE 14

Oxidation of Lard[1] at 230° C. with 1000 mg · kg$^{-1}$ Cu$^{2+}$

| Time (min) | Temp (° C.) | V$_{out}$ (mL) |
|---|---|---|
| 0 | sample taken from inlet line to reactor[2] | |
| 10 | 225 | 86.3 |
| 20 | 225 | 77.2 |
| 30 | 227 | 55.8 |
| 45 | 227 | 105.9 |
| 60 | 225 | 101.1 |
| 90 | 225 | 227.8 |
| 120 | 225 | 200.0 |
| 150 | 227 | 227.3 |
| 180 | 227 | 216.6 |
| Vol left in reactor: | | 154.0 |

[1]300 mL H$_2$0 initially in the reactor, with 1.20 g CuSO$_4$.5H$_2$0 (1000 mg · kg$^{-1}$ Cu$^{2+}$). Reactor brought to 230° C. before pumping from the hydraulic plunger began.
[2]i.e. this equates to the untreated sample.

The COD of the feedstock was constant at 6850 mg.kg$^{-1}$ while that of the treated products was found to be approximately 1400 mg.kg$^{-1}$.

Overall, the feedstock had a total COD of 9.90 g, while the products recovered had total COD of 1.68 g which is a reduction of 83% (see Table 16).

TABLE 15

Oxidation of Lard (1000 mg · kg$^{-1}$ Cu$^{2+}$) - COD data

| Time (min) | COD (mg · L$^{-1}$) |
|---|---|
| 0 | 6850 |
| 10 | 1190 |
| 20 | 1190 |
| 30 | 1190 |
| 45 | 1400 |
| 60 | 1400 |
| 90 | 1480 |
| 120 | 1250 |
| 150 | 1220 |
| 180 | 1220 |
| Post-run | 2020 |

TABLE 16

Summary of Results in the Oxidation of Lard (1000 mg · kg$^{-1}$ Cu$^{2+}$)

| Component | Result |
|---|---|
| Total COD in | 9.90 g |
| Total COD out | 1.68 g |
| Reduction in COD | 8.19 g |
| Percentage reduction in COD | 83.0% w/w |
| Total volume treated | 1740 mL |
| Lost as vapour | 288 mL |
| Batch ratio | 5.8 (based on 300 mL) |

EXAMPLE 4

Figure 3:
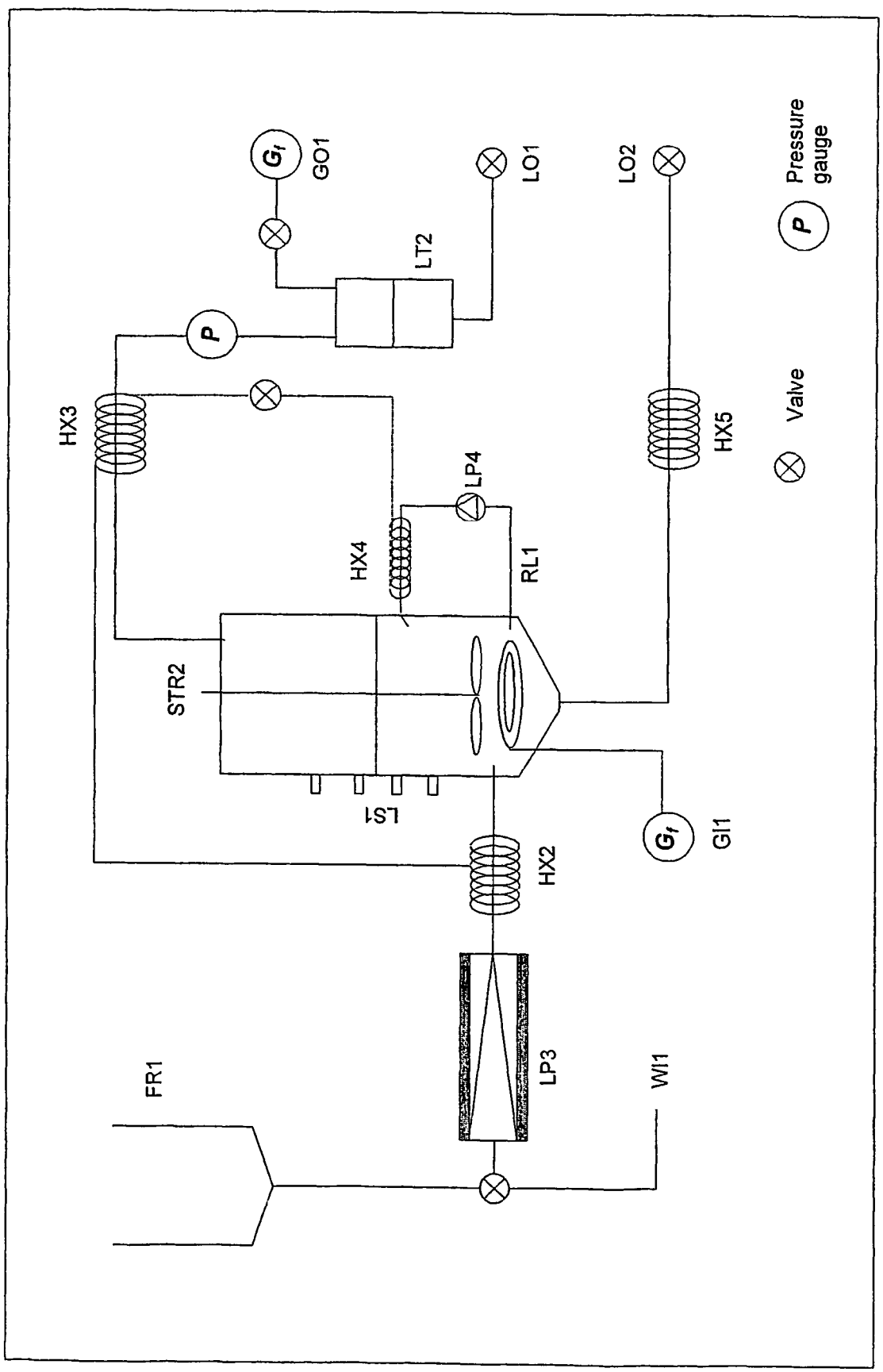
FIG. 3 is a schematic diagram of a proposed pilot plant or commercial plant design.

A proposed pilot plant or commercial plant design utilising the process of the invention is schematically shown in, and described with reference to, FIG. 3.

Non-volatile oxidisable material held in a reservoir FR1 would be combined with sufficient water from inlet WI1 to form the feedstock which is transferred into a reactor vessel by pump LP3. The temperature of the feedstock would be increased by heat exchanger HX2 which may recycle the heat recovered from the oxidation products removed in the vapour phase by cool-down heat exchanger HX3. It will be appreciated that the feedstock need be heated only to make up the heat balance of the reaction.

An oxidant would be introduced into the reactor vessel though inlet GI1. Contact between the oxidant and the liquid phase will Then be promoted by means of a stirrer STR2 which mixes the reactor contents. The liquid level within the reactor may be monitored by a system of level sensors LS1 connected to a suitable process control system.

The temperature of the liquid phase in the reactor would be controlled by a heating unit and heat exchanger HX4 by means of the recirculating loop RL1 and pump LP4. HX4 may also recycle the heat recovered from the oxidation products removed in the vapour phase by cool-down heat exchanger HX3

The vapour phase products of the oxidation reaction would be separated from the liquid phase and removed from the reactor through cool-down heat exchanger HX3. The temperature and pressure of the product stream is thereby reduced. The resultant product stream would pass into liquid tap LT2 where gas phase reaction products such as carbon dioxide may be recovered from the mix of uncondensed gases at outlet GO1 while liquid phase reaction products such as water, formic acid and acetic acid may be recovered at outlet LO1.

The reactor could be emptied, when required, through outlet LO2 and the heat from the reactor contents may be recovered by heat exchanger HX5. Accordingly, useful non-volatile salts which accumulate in the reactor may be recovered and any catalyst used may be recycled or subject to suitable disposal.

INDUSTRIAL APPLICATION

It will be appreciated hat, in use, the present invention provides a process for oxidising a feedstock which may be applied to the treatment of industrial waste. Advantageously, the reactor may be of a significantly smaller volume than that used in known processes due to the removal of both water and volatile oxidation products from the reactor in the vapour phase, allowing for further feedstock to enter the system. In this way the process may be operated in a continuous manner.

In addition, a homogenous catalyst may be used in the treatment of more stable compounds, and the catalyst retained in the reactor while multiple volumes of waste are treated. A variety of consumer and industrial waste is amenable to treatment by a process of the invention, and these are discussed above.

Furthermore, the present invention also provides a sterile source of, for example, acetic acid which may be utilised, following conversion to acetate, as a nutrient source for micro-organisms.

Those persons skilled in the art will further appreciate that the present description is provided by way of example only and that the scope of the invention is not limited thereto.

REFERENCES

1. Kolackowski, S., Plucinski, P., Beltran F., Rivas, F., McLurgh, D. "Wet air oxidation: a review of process technologies and aspects in reactor design", *Chem. Eng. J. (Lausanne)*, 1999, 73, 2, 143-160.

The invention claimed is:

1. A process for wet oxidation of a feedstock comprising at least one non-volatile oxidisable material, which process includes at least the steps of:
   (a) continuously introducing the feedstock into a reactor;
   (b) contacting the feedstock at temperature and pressure with an oxidant in the presence of a homogeneous catalyst to produce a vapour phase comprising at least some oxidation products and a liquid phase; and
   (c) continuously removing at least some of the vapour phase comprising at least some oxidation products from the reactor while retaining the liquid phase in the reactor, wherein the vapour phase is removed from the reactor by flash vaporization.

2. A process as claimed in claim 1 wherein the feedstock is an aqueous liquid, solution, suspension, colloid, emulsion or other mixture.

3. A process as claimed in claim 1 wherein the feedstock comprises a slurry formed from substantially dry material to which is added an aqueous liquid.

4. A process as claimed in claim 1 wherein the oxidisable material comprises less than about 10% by weight of the feedstock.

5. A process as claimed in claim 1 wherein the oxidisable material comprises a mixture of substances.

6. A process as claimed in claim 1 wherein the oxidisable material is a waste product selected from industrial waste, consumer waste or a component thereof.

7. A process as claimed in claim 6 wherein the oxidisable material is waste selected from the group consisting of: dairy shed waste; pig and chicken waste; milk processing plant waste; milk, cheese and butter vat wash downs; food processing waste; waste from the wine industry and brewing industry; food waste; shipboard waste; waste in environmentally sensitive locations; waste from the wash downs and oil-traps of petroleum service stations and garages; waste fats and proteins from the meat processing industry; wool-scouring waste; sewage; medical waste; fibre, ink and polymeric material from the deinking waste produced in the recycling of paper; waste paper and paper products; waste from the wood processing industry including waste wood and wood products, wood fibre, saw dust and wood treated with preservatives; rubber waste; plastic waste; and tannin and colorants from wood pulping streams.

8. A process as claimed in claim 1 wherein the process is applied to the reclamation of sites contaminated by organic materials.

9. A process as claimed in claim 1 wherein the oxidisable material comprises an organic substance.

10. A process as claimed in claim 9 wherein the organic substance is selected from the group consisting of: lipids; proteins; carbohydrates; mineral oils; vegetable oils; waxes; and hydrocarbons.

11. A process as claimed in claim 10 wherein the organic substance is a carbohydrate selected from starch and cellulose.

12. A process as claimed in claim 1 wherein the oxidisable material includes one or more oxidisable inorganic compounds.

13. A process as claimed in claim 1 wherein the oxidant is selected from the group consisting of: air; oxygen; ozone; peroxide; and mixtures thereof.

14. A process as claimed in claim 1 wherein the temperature is between about 100° C. and about 350° C.

15. A process as claimed in claim 1 wherein the temperature is between about 190° C. and about 300° C.

16. A process as claimed in claim 1 wherein the temperature is between about 190° C. and about 280° C.

17. A process as claimed in claim 1 wherein the temperature is between about 190° C. and about 210° C.

18. A process as claimed in claim 1 wherein the temperature is between about 220° C. and about 240° C.

19. A process as claimed in claim 1 wherein the pressure is between about 0.7 MPa and about 17.2 MPa.

20. A process as claimed in claim 1 wherein the pressure is between about 1.4 MPa and about 13.0 MPa.

21. A process as claimed in claim 1 wherein the pressure is between about 2.0 MPa and about 3.5 MPa.

22. A process as claimed in claim 1 wherein the pressure is between about 2.1 MPa and about 2.9 MPa.

23. A process as claimed in claim 1 wherein the pressure is between about 2.9 MPa and about 3.4 MPa.

24. A process as claimed in claim 1 wherein the catalyst is selected from the group consisting of the transition metal ions and mixtures thereof.

25. A process as claimed in claim 1 wherein the catalyst is selected from the group consisting of: copper (II) ions; iron (II) ions; manganese (II) ions; and mixtures thereof.

26. A process as claimed in claims 1 wherein the catalyst is copper (II) ions.

27. A process as claimed in claim 1 further including the step of reducing the temperature and pressure of the vapour phase to recover at least one oxidation product.

28. A process as claimed in claim 27 wherein the oxidation product is selected from the group consisting of: carbon dioxide; formic acid; acetic acid; higher organic acids; and mixtures thereof.

29. A process as claimed in claim 1 further comprising the step of recovering at least one non-volatile salt from the liquid phase.

* * * * *